United States Patent [19]
Camp et al.

[11] Patent Number: 5,592,517
[45] Date of Patent: Jan. 7, 1997

[54] CASCADED COMB INTEGRATOR INTERPOLATING FILTERS

[75] Inventors: James C. Camp, Sudbury; James P. Mulvey, Woburn, both of Mass.

[73] Assignee: Tellabs Wireless, Inc., Burlington, Mass.

[21] Appl. No.: 519,877

[22] Filed: Aug. 28, 1995

Related U.S. Application Data

[63] Continuation-in-part of Ser. No. 220,728, Mar. 31, 1994, abandoned and PCT/US95/04004, Mar. 30, 1995.

[51] Int. Cl.$^6$ .................................................. G06F 15/31
[52] U.S. Cl. ...................................... 375/350; 364/724.1
[58] Field of Search .................................... 375/350, 240; 364/724.1; 341/61

[56] References Cited

U.S. PATENT DOCUMENTS

| | | | |
|---|---|---|---|
| 4,999,798 | 3/1991 | McCaslin et al. | 364/724.1 |
| 5,043,933 | 8/1991 | Boutaud et al. | 364/724.1 |

OTHER PUBLICATIONS

IEEE Transactions on Acoustics, Speech, and Signal Processing, vol. ASSP-29, No. 2, Apr. 1981, Hogenauer, "An Economical Class of Digital Filters for Decimation and Interpolation".

IEEE Transactions on Circuits and Systems, vol. CAS-31, No. 11, Nov. 1984, Chu et al., "Multirate Filter Designs Using Comb Filters".

*Primary Examiner*—Stephen Chin
*Assistant Examiner*—Kevin Kim
*Attorney, Agent, or Firm*—Fish & Richardson P.C.

[57] ABSTRACT

A robust interpolator performs internal data correction to avoid catastrophic errors. The interpolator includes a filter connected to an integrator by both a feedforward path and an element that increases the data rate of the output of the filter. The filter processes signals arriving at an input data rate to produce differentiated data and filtered data. The filtered data represents an output of the integrator in the absence of error. The integrator receives the differentiated data from the element at a data rate higher than the input data rate, and receives the filtered data via the feedforward path. A transmultiplexer producing a wideband signal from two or more narrowband signals employs the interpolator to increase the data rate of its output.

30 Claims, 9 Drawing Sheets

| | Reg 404 | Reg 410 | Register 412 | Register 414 | Register 318 | Reg 318' | Reg 420 | Reg 420' | Reg 430 | Reg 430' |
|---|---|---|---|---|---|---|---|---|---|---|
| m | C_Reg | D_Reg | M_Reg | A_Reg | Q1A_Reg | I1A_Reg | Q2A_Reg | I2A_Reg | Q3A_Reg | I3A_Reg |
| 0 | a3(0) | Q(n) | x | x | a3*Q(n-1) | a3*I(n-1) | b32*Q(n-1) | b32*I(n-1) | b33*Q(n-1) | b33*I(n-1) |
| 1 | a3(1) | Q(n-1) | a3(0)*Q(n) | x | a3*Q(n-1) | a3*I(n-1) | b32*Q(n-1) | b32*I(n-1) | b33*Q(n-1) | b33*I(n-1) |
| 2 | a3(2) | Q(n-2) | a3(1)*Q(n-1) | a3(0)*Q(n) | a3*Q(n-1) | a3*I(n-1) | b32*Q(n-1) | b32*I(n-1) | b33*Q(n-1) | b33*I(n-1) |
| 3 | a3(0) | I(n) | a3(2)*Q(n-2) | a3(0)*Q(n)+a3(1)*Q(n-1) | a3*Q(n-1) | a3*I(n-1) | b32*Q(n-1) | b32*I(n-1) | b33*Q(n-1) | b33*I(n-1) |
| 4 | a3(1) | I(n-1) | a3(0)*I(n) | a3(0)*Q(n)+a3(1)*Q(n-1)+a3(2)*Q(n-2) = a3*Q(n) | a3*Q(n-1) | a3*I(n-1) | b32*Q(n-1) | b32*I(n-1) | b33*Q(n-1) | b33*I(n-1) |
| 5 | a3(2) | I(n-2) | a3(1)*I(n-1) | a3(0)*I(n) | *a3\*Q(n)* | a3*I(n-1) | b32*Q(n-1) | b32*I(n-1) | b33*Q(n-1) | b33*I(n-1) |
| 6 | b32(0) | Q(n-1) | a3(2)*I(n-2) | a3(0)*I(n)+a3(1)*I(n-1) | a3*Q(n) | a3*I(n-1) | b32*Q(n-1) | b32*I(n-1) | b33*Q(n-1) | b33*I(n-1) |
| 7 | b32(1) | Q(n-2) | b32(0)*Q(n-1) | a3(0)*I(n)+a3(1)*I(n-1)+a3(2)*I(n-2) = a3*I(n) | a3*Q(n) | *a3\*I(n)* | b32*Q(n-1) | b32*I(n-1) | b33*Q(n-1) | b33*I(n-1) |
| 8 | b32(0) | I(n-1) | b32(1)*Q(n-2) | b32(0)*Q(n-1) | a3*Q(n) | a3*I(n) | b32*Q(n-1) | b32*I(n-1) | b33*Q(n-1) | b33*I(n-1) |
| 9 | b32(1) | I(n-2) | b32(0)*I(n-1) | b32(0)*Q(n-1)+b32(1)*Q(n-2) = b32*Q(n) | a3*Q(n) | a3*I(n) | b32*Q(n-1) | *b32\*I(n)* | b33*Q(n-1) | b33*I(n-1) |
| 10 | b33(0) | Q(n-1) | b32(1)*I(n-2) | b32(0)*I(n-1) | a3*Q(n) | a3*I(n) | *b32\*Q(n)* | b32*I(n) | b33*Q(n-1) | b33*I(n-1) |
| 11 | b33(1) | Q(n-2) | b33(0)*Q(n-1) | b32(0)*I(n-1)+b32(1)*I(n-2) = b32*I(n) | a3*Q(n) | a3*I(n) | b32*Q(n) | b32*I(n) | b33*Q(n-1) | b33*I(n-1) |
| 12 | b33(0) | I(n-1) | b33(1)*Q(n-2) | b33(0)*Q(n-1) | a3*Q(n) | a3*I(n) | b32*Q(n) | b32*I(n) | b33*Q(n-1) | b33*I(n-1) |
| 13 | b33(1) | I(n-2) | b33(0)*I(n-1) | b33(0)*Q(n-1)+b33(1)*Q(n-2) = b33*Q(n) | a3*Q(n) | a3*I(n) | b32*Q(n) | b32*I(n) | *b33\*Q(n)* | b33*I(n-1) |
| 14 | x | x | b33(1)*I(n-2) | b33(0)*I(n-1) | a3*Q(n) | a3*I(n) | b32*Q(n) | b32*I(n) | b33*Q(n) | b33*I(n-1) |
| 15 | x | x | x | b33(0)*I(n-1)+b33(1)*I(n-2) = b33*I(n) | a3*Q(n) | a3*I(n) | b32*Q(n) | b32*I(n) | b33*Q(n) | *b33\*I(n)* |
| 16 | x | x | x | x | a3*Q(n) | a3*I(n) | b32*Q(n) | b32*I(n) | b33*Q(n) | b33*I(n) |
| 17 | x | x | x | x | a3*Q(n) | a3*I(n) | b32*Q(n) | b32*I(n) | b33*Q(n) | b33*I(n) |
| 18 | x | x | x | x | a3*Q(n) | a3*I(n) | b32*Q(n) | b32*I(n) | b33*Q(n) | b33*I(n) |
| ... | | | | | | | | | | |
| R-1 | x | x | x | x | a3*Q(n) | a3*I(n) | b32*Q(n) | b32*I(n) | b33*Q(n) | b33*I(n) |

| m | Register 320 Q1M_Reg | Register 320' I1M_Reg | Register 428 Q2M_Reg | Register 428' I2M_Reg |
|---|---|---|---|---|
| 0 | $a3*Q(n-1)$ | $a3*I(n-1)$ | $b32*Q(n-1)+(R-16)a3*Q(n-1)$ | $b32*I(n-1)+(R-16)a3*I(n-1)$ |
| 1 | $a3*Q(n-1)$ | $a3*I(n-1)$ | $b32*Q(n-1)+(R-15)a3*Q(n-1)$ | $b32*I(n-1)+(R-15)a3*I(n-1)$ |
| 2 | $a3*Q(n-1)$ | $a3*I(n-1)$ | $b32*Q(n-1)+(R-14)a3*Q(n-1)$ | $b32*I(n-1)+(R-14)a3*I(n-1)$ |
| 3 | $a3*Q(n-1)$ | $a3*I(n-1)$ | $b32*Q(n-1)+(R-13)a3*Q(n-1)$ | $b32*I(n-1)+(R-13)a3*I(n-1)$ |
| 4 | $a3*Q(n-1)$ | $a3*I(n-1)$ | $b32*Q(n-1)+(R-12)a3*Q(n-1)$ | $b32*I(n-1)+(R-12)a3*I(n-1)$ |
| 5 | $a3*Q(n-1)$ | $a3*I(n-1)$ | $b32*Q(n-1)+(R-11)a3*Q(n-1)$ | $b32*I(n-1)+(R-11)a3*I(n-1)$ |
| 6 | $a3*Q(n-1)$ | $a3*I(n-1)$ | $b32*Q(n-1)+(R-10)a3*Q(n-1)$ | $b32*I(n-1)+(R-10)a3*I(n-1)$ |
| 7 | $a3*Q(n-1)$ | $a3*I(n-1)$ | $b32*Q(n-1)+(R-9)a3*Q(n-1)$ | $b32*I(n-1)+(R-9)a3*I(n-1)$ |
| 8 | $a3*Q(n-1)$ | $a3*I(n-1)$ | $b32*Q(n-1)+(R-8)a3*Q(n-1)$ | $b32*I(n-1)+(R-8)a3*I(n-1)$ |
| 9 | $a3*Q(n-1)$ | $a3*I(n-1)$ | $b32*Q(n-1)+(R-7)a3*Q(n-1)$ | $b32*I(n-1)+(R-7)a3*I(n-1)$ |
| 10 | $a3*Q(n-1)$ | $a3*I(n-1)$ | $b32*Q(n-1)+(R-6)a3*Q(n-1)$ | $b32*I(n-1)+(R-6)a3*I(n-1)$ |
| 11 | $a3*Q(n-1)$ | $a3*I(n-1)$ | $b32*Q(n-1)+(R-5)a3*Q(n-1)$ | $b32*I(n-1)+(R-5)a3*I(n-1)$ |
| 12 | $a3*Q(n-1)$ | $a3*I(n-1)$ | $b32*Q(n-1)+(R-4)a3*Q(n-1)$ | $b32*I(n-1)+(R-4)a3*I(n-1)$ |
| 13 | $a3*Q(n-1)$ | $a3*I(n-1)$ | $b32*Q(n-1)+(R-3)a3*Q(n-1)$ | $b32*I(n-1)+(R-3)a3*I(n-1)$ |
| 14 | $a3*Q(n-1)$ | $a3*I(n-1)$ | $b32*Q(n-1)+(R-2)a3*Q(n-1)$ | $b32*I(n-1)+(R-2)a3*I(n-1)$ |
| 15 | $a3*Q(n)$ | $a3*I(n)$ | $b32*Q(n-1)+(R-1)a3*Q(n-1)$ | $b32*I(n-1)+(R-1)a3*I(n-1)$ |
| 16 | $a3*Q(n)$ | $a3*I(n)$ | $b32*Q(n)$ | $b32*I(n)$ |
| 17 | $a3*Q(n)$ | $a3*I(n)$ | $b32*Q(n)+a3*Q(n)$ | $b32*I(n)+a3*I(n)$ |
| 18 | $a3*Q(n)$ | $a3*I(n)$ | $b32*Q(n)+2a3*Q(n)$ | $b32*I(n)+2a3*I(n)$ |
| | $a3*Q(n)$ | $a3*I(n)$ | $b32*Q(n)+3a3*Q(n)$ | $b32*I(n)+3a3*I(n)$ |
| | $a3*Q(n)$ | $a3*I(n)$ | $b32*Q(n)+4a3*Q(n)$ | $b32*I(n)+4a3*I(n)$ |
| | $a3*Q(n)$ | $a3*I(n)$ | $b32*Q(n)+5a3*Q(n)$ | $b32*I(n)+5a3*I(n)$ |
| | $a3*Q(n)$ | | | |
| | $a3*Q(n)$ | | | |
| | $a3*Q(n)$ | | | |
| R-1 | $a3*Q(n)$ | $a3*I(n)$ | $b32*Q(n)+(R-17)a3*Q(n)$ | $b32*I(n)+(R-17)a3*I(n)$ |

FIG. 9

| m | Register 440 Q3M_Reg | Register 440' I3M_Reg | Reg 442 QE_Reg | Reg 442' IE_Reg |
|---|---|---|---|---|
| 0 | b33*Q(n-1)+(R-17)b32*Q(n-1)+F(R-17)a3*Q(n-1) | b33*I(n-1)+(R-17)b32*I(n-1)+F(R-17)a3*I(n-1) | QE(n-1) | IE(n-1) |
| 1 | b33*Q(n-1)+(R-16)b32*Q(n-1)+F(R-16)a3*Q(n-1) | b33*I(n-1)+(R-16)b32*I(n-1)+F(R-16)a3*I(n-1) | QE(n-1) | IE(n-1) |
| 2 | b33*Q(n-1)+(R-15)b32*Q(n-1)+F(R-15)a3*Q(n-1) | b33*I(n-1)+(R-15)b32*I(n-1)+F(R-15)a3*I(n-1) | QE(n-1) | IE(n-1) |
| 3 | b33*Q(n-1)+(R-14)b32*Q(n-1)+F(R-14)a3*Q(n-1) | b33*I(n-1)+(R-14)b32*I(n-1)+F(R-14)a3*I(n-1) | QE(n-1) | IE(n-1) |
| 4 | b33*Q(n-1)+(R-13)b32*Q(n-1)+F(R-13)a3*Q(n-1) | b33*I(n-1)+(R-13)b32*I(n-1)+F(R-13)a3*I(n-1) | QE(n-1) | IE(n-1) |
| 5 | b33*Q(n-1)+(R-12)b32*Q(n-1)+F(R-12)a3*Q(n-1) | b33*I(n-1)+(R-12)b32*I(n-1)+F(R-12)a3*I(n-1) | QE(n-1) | IE(n-1) |
| 6 | b33*Q(n-1)+(R-11)b32*Q(n-1)+F(R-11)a3*Q(n-1) | b33*I(n-1)+(R-11)b32*I(n-1)+F(R-11)a3*I(n-1) | QE(n-1) | IE(n-1) |
| 7 | b33*Q(n-1)+(R-10)b32*Q(n-1)+F(R-10)a3*Q(n-1) | b33*I(n-1)+(R-10)b32*I(n-1)+F(R-10)a3*I(n-1) | QE(n-1) | IE(n-1) |
| 8 | b33*Q(n-1)+(R-9)b32*Q(n-1)+F(R-9)a3*Q(n-1) | b33*I(n-1)+(R-9)b32*I(n-1)+F(R-9)a3*I(n-1) | QE(n-1) | IE(n-1) |
| 9 | b33*Q(n-1)+(R-8)b32*Q(n-1)+F(R-8)a3*Q(n-1) | b33*I(n-1)+(R-8)b32*I(n-1)+F(R-8)a3*I(n-1) | QE(n-1) | IE(n-1) |
| 10 | b33*Q(n-1)+(R-7)b32*Q(n-1)+F(R-7)a3*Q(n-1) | b33*I(n-1)+(R-7)b32*I(n-1)+F(R-7)a3*I(n-1) | QE(n-1) | IE(n-1) |
| 11 | b33*Q(n-1)+(R-6)b32*Q(n-1)+F(R-6)a3*Q(n-1) | b33*I(n-1)+(R-6)b32*I(n-1)+F(R-6)a3*I(n-1) | QE(n-1) | IE(n-1) |
| 12 | b33*Q(n-1)+(R-5)b32*Q(n-1)+F(R-5)a3*Q(n-1) | b33*I(n-1)+(R-5)b32*I(n-1)+F(R-5)a3*I(n-1) | QE(n-1) | IE(n-1) |
| 13 | b33*Q(n-1)+(R-4)b32*Q(n-1)+F(R-4)a3*Q(n-1) | b33*I(n-1)+(R-4)b32*I(n-1)+F(R-4)a3*I(n-1) | QE(n-1) | IE(n-1) |
| 14 | b33*Q(n-1)+(R-3)b32*Q(n-1)+F(R-3)a3*Q(n-1) | b33*I(n-1)+(R-3)b32*I(n-1)+F(R-3)a3*I(n-1) | QE(n-1) | IE(n-1) |
| 15 | b33*Q(n-1)+(R-2)b32*Q(n-1)+F(R-2)a3*Q(n-1) | b33*I(n-1)+(R-2)b32*I(n-1)+F(R-2)a3*I(n-1) | QE(n-1) | IE(n-1) |
| 16 | b33*Q(n-1)+(R-1)b32*Q(n-1)+F(R-1)a3*Q(n-1) | b33*I(n-1)+(R-1)b32*I(n-1)+F(R-1)a3*I(n-1) | QE(n-1) | IE(n-1) |
| 17 | b33*Q(n) | b33*I(n) | QE(n) | IE(n) |
| 18 | b33*Q(n)+b32*Q(n)+a3*Q(n) | b33*I(n)+b32*I(n)+a3*I(n) | QE(n) | IE(n) |
|  | b33*Q(n)+2b32*Q(n)+2a3*Q(n) | b33*I(n)+2b32*I(n)+2a3*I(n) | QE(n) | IE(n) |
|  | b33*Q(n)+3b32*Q(n)+5a3*Q(n) | b33*I(n)+3b32*I(n)+5a3*I(n) | QE(n) | IE(n) |
|  | b33*Q(n)+4b32*Q(n)+9a3*Q(n) | b33*I(n)+4b32*I(n)+9a3*I(n) | QE(n) | IE(n) |
|  | b33*Q(n)+4b32*Q(n)+14a3*Q(n) | b33*I(n)+4b32*I(n)+14a3*I(n) | QE(n) | IE(n) |
| R-1 | b33*Q(n)+(R-18)b32*Q(n)+F(R-18)a3*Q(n) | b33*I(n)+(R-18)b32*I(n)+F(R-18)a3*I(n) | | |

$F(x) = 0.5 \cdot x \cdot (x+1)$

CASCADED COMB INTEGRATOR INTERPOLATING FILTERS

BACKGROUND

This application is a continuation-in-part of U.S. patent application Ser. No. 08/220,728, filed on Mar. 31, 1994 now abandoned, and PCT application Ser. No. PCT/US95/04004, filed on Mar. 30, 1995.

This invention relates to interpolating filters.

A digital interpolating filter increases the sample rate of a stream of digital data while introducing only a bounded aliasing error into the data stream. An example of an interpolating filter is a cascaded comb integrator (CCI) or Hogenauer filter, described in detail in "An Economical Class of Digital filters for Decimation and Interpolation", E. Hogenauer, IEEE Transactions on Acoustics, Speech and Signal Processing, Vol. 29, No. 2, April 1981. CCI interpolating filters consist of a series of cascaded differentiators receiving data at a low sample rate connected to an identical number of cascaded integrators processing data at a higher sampling rate.

Although the integrators of a CCI filter have an infinite impulse response (IIR), the CCI filter itself has a finite impulse response (FIR), due to the exact cancellation of poles in the frequency response of the integrators by zeroes in the response of the differentiators. CCI filters provide the advantage of including few storage elements (or delays) and no multipliers, and thus can be used in high speed, low cost applications.

Digital interpolating filters are used in a wide range of applications. For example, transmultiplexers employ digital interpolating filters to combine narrowband digital signals transmitted at a low data rate into a wideband signal transmitted at a higher data rate.

SUMMARY

The invention features a CCI interpolating filter (an interpolator) which performs error correction at each cascaded integrator in the filter.

In general, in one aspect, the interpolator includes a filter connected to an integrator by both a feedforward path and an element that increases the data rate of the output of the filter. The filter processes signals arriving at an input data rate to produce differentiated data and filtered data. The filtered data represents an output of the integrator in the absence of error. The integrator receives the differentiated data from the element at a data rate higher than the input data rate, and receives the filtered data via the feedforward path.

Preferred embodiments of the invention include the following features. The filter in the interpolator has a differentiator producing the differentiated data and a component producing the filtered data. The component includes a multiplier or an adder.

A switch between the integrator and the feedforward path selectively connects the feedforward path to the integrator. The switch may disconnect the differentiated data from the integrator before connecting the feedforward path. Alternatively, the switch may disconnect a feedback path in the integrator and connect the feedforward path to the integrator in its place. The switching occurs at the input data rate.

In other embodiments, a comparator is connected between the feedforward path and an output of the integrator. The comparator compares the output of the integrator and the filtered data to determine whether an error has occurred in the interpolator. The interpolator may also include a second integrator connected in series with the first integrator. A second feedforward path is connected between the filter and the second integrator.

In still other embodiments, the interpolator processes two separate input signals, for example, two interleaved quadrature and in-phase signals. In these embodiments, the interpolator includes a second integrator connected in parallel to the first integrator. The filter processes the separate signals to produce separate differentiated and filtered signals for each integrator. A second feedforward path connected between the filter and the second integrator supplies the appropriate filtered output to the second integrator.

The element increasing the data rate may include a zero order hold or an upsampling switch.

In still other embodiments, the interpolator has (L-2) integrators connected in series to the first integrator, where L is an integer greater than two. A separate feedforward path is connected between each of the (L-2) integrators and the filter. A portion of the filter producing the differentiated data for the first integrator has an impulse response $a_L(n)$ given by $$a_L(n) = \frac{(-1)^n}{n!} \prod_{k=0}^{n-1} (L-n+k)$$

where n=0,1, ... L-1.

The filter also produces filtered data for each integrator. A portion of the filter producing the filtered data sent to an mth integrator via the mth feedforward path has impulse response $b_{L,m}(n)$:

$$b_{L,m}(n) = m \sum_{k=0}^{m-1} \frac{u(n-k)}{(n-k)!} \prod_{s=1}^{n-k} (L-m-n+k+s) \sum_{g=0}^{k} \frac{(-1)^{n-k+g}}{g!(m-g)!} \cdot \prod_{j=0}^{m-2} (R(k-g+1)+j)$$

where u(n)=1 n≥0
=0 n<0

R is the interpolation factor of the interpolator, m=2,3, ... , L and n=0,1, ... , L-2.

The interpolator recovers from an error in an integrator by replacing an output of the integrator by a corrected value each time the switch connects the feedforward path to the integrator. With a fast input switching rate, e.g., one Megacycle per second, errors persist for no longer than one microsecond in the interpolator. This is a significant improvement over standard CCI interpolating filters which are subject to catastrophic errors, i.e., they are unable to recover from an error occurring in an integrator, so that a single transient error forever distorts the interpolated output of the filter.

The interpolator provides this improvement by adding only a single feedforward path for each integrator and replaces an inner differentiator-integrator pair with a zero order hold. The filter formed is thus extremely compact and adds no additional source of catastrophic error, i.e., no feedback path is added to the filter circuitry.

By replacing the inner differentiator-integrator pair, the zero order hold both reduces the size of the filter and removes an additional source of catastrophic error (the integrator) from the filter.

In general, in another aspect, the invention features a transmultiplexer for combining narrowband signals into a wideband signal. The transmultiplexer has two interpolators connected in parallel that each process a narrowband signal. An adder adds the output of the two interpolators to produce the wideband signal. Each interpolator includes a filter connected to an integrator by an element that increases the data rate of the output of the filter. The filter processes its input to produce differentiated data and filtered data. The filtered data represents data produced by the integrator in the absence of error. The integrator receives the differentiated data from the element at a data rate higher than the input data rate. A feedforward path between the filter and a feedback path of the integrator provides the filtered data to the integrator.

In a preferred embodiment, the transmultiplexer has a second interpolating filter connected in series with each interpolator.

Other features and advantages of the invention will become apparent from the following description and from the claims.

BRIEF DESCRIPTION OF THE DRAWINGS

FIGS. 7 through 9 are timing diagrams for the registers in the third order interpolating filter of FIG. 6.

DESCRIPTION

Figure 1:
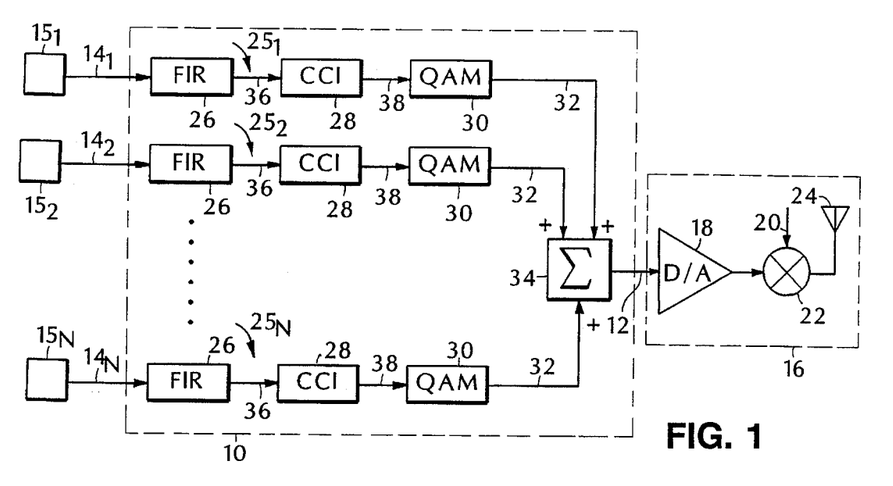
FIG. 1 is a block diagram of a transmultiplexer connected to a transmitter.

Referring to FIG. 1, a narrowband transmultiplexer 10 produces a broadband digital signal 12 from a set of narrowband digital data streams $14_1$ to $14_N$ arriving over channels $15_1$ to $15_N$, respectively. The transmultiplexer provides broadband digital signal 12 to a transmitter 16 that converts digital signal 12 to analog in a D/A converter 18 before shifting the signal by a local oscillator frequency 20 in a mixer 22, e.g., 800 MHz for U.S. cellular band transmissions. The shifted signal is then broadcast by a transmitting antenna 24. The transmitter and transmultiplexer thus function as a combination of N narrowband transmitters broadcasting data arriving over channels 1 through N simultaneously.

The transmultiplexer contains N circuits $25_1$ to $25_N$, each separately receiving data streams $14_1$ to $14_N$, respectively. Each circuit processes a corresponding data stream 14 in an FIR interpolating filter 26, a CCI filter 28 and a modulator 30 connected in series. Each filtered and modulated output signal 32 from each circuit is then combined in an adder 34 to provide the wideband signal 12.

In operation, each data stream $14_1$ to $14_N$ arrives at the transmultiplexer at a constant data rate, e.g., at 194.4 kilosamples per second. The data rate of each data stream is increased by a factor of 160 in the FIR filter 26 and the connected CCI filter 28. The FIR filter is a standard, highly accurate, fine interpolator that increases the rate of the data stream by a factor of eight at a relatively low processing rate. The CCI filter then coarsely interpolates output 36 of the FIR filter to increase the data rate by an additional factor of 20 at a higher processing rate. The FIR filter is thus used to accurately interpolate the slower data stream 14 without incurring a large delay, while the CCI filter provides a less accurate but more rapid interpolation of the faster FIR output 36. The FIR and CCI filters thus together provide a large rate increase (by a factor of 160) both accurately and efficiently.

Each stream of interpolated output data 38 from each CCI filter then passes through a connected modulator 30 that encodes the output 38 for transmission. To transmit cellular data, the modulator quadrature amplitude modulates each interpolated output data stream 38. Each modulated and interpolated output signal 32 is then combined in adder 34 to produce the wideband signal 12. The transmultiplexer typically contains control circuitry allowing a user to determine the frequency band occupied by each interpolated and modulated output signal 32 in the wideband signal 12, i.e., the modulator selectively frequency shifts each output 38 to a desired band before combining the resulting shifted signals 32 in the broadband signal 12.

Figure 2:
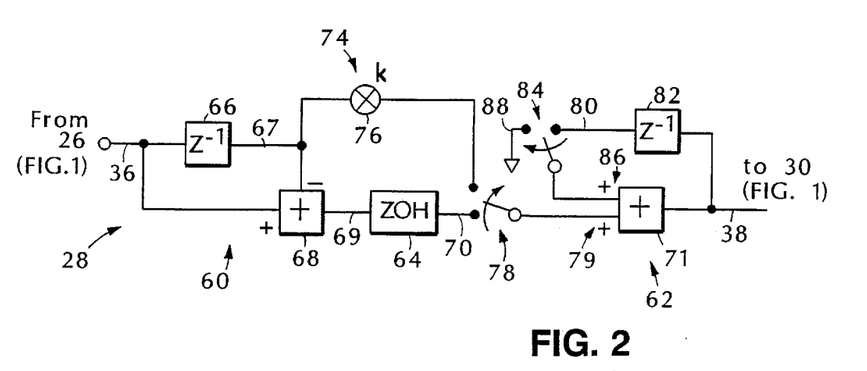
FIG. 2 is a block diagram of a second order interpolating filter, according to the invention.

As shown in FIG. 2, the CCI filter 28 consists of a differentiator 60 connected in series to an integrator 62 by a zero order hold 64. The CCI filter is thus a second order CCI filter with the zero order hold replacing an inner cascaded differentiator-integrator pair.

Data points in the output stream 36 of the FIR filter arrive at the CCI filter separated by a constant sample period (T) determined by the data rate of each data stream 14. The CCI filter differentiates the output stream 36 by first shifting stream 36 in a first order delay 66 (by one sample period) before subtracting the delayed stream 67 from the original stream 36 in an adder 68. The differentiated output 69 of the adder then passes into the zero order hold, which decreases the sample period of the differentiated output by a factor of twenty by repeating each data point in the output twenty times within a sample period (T) of the output stream 36.

A switch 78 placed between the zero order hold 64 and the summer 71 periodically interrupts the output 70 of the zero order hold and connects a feedforward path 74 to an input 79 of the summer 71. The feedforward path 74 connects the delayed stream 67 from the FIR filter to the switch 78 through a gain 76 (k). The magnitude of the gain corresponds to the gain of the CCI filter, which is equal to the interpolation factor, i.e., k=20.

The summer 71 in the integrator adds data received over its input 79 (either the output 70 of the zero order hold or data carried by the feedforward path) to a delayed interpolated output 80 produced by passing output 38 of the summer through a first order delay 82. A switch 84 periodically interrupts the delayed output 80 from a second input 86 of the summer and connects input 86 to ground 88. The output of the summer provides the interpolated output 38 of the CCI filter.

Switch 78 normally connects the zero order hold to the input 79 of the summer 71, but is synchronized with the FIR filter output 36 to disconnect output 70 of the zero order hold and connect the feedforward path 74 to the input 79 of the summer 71 each time a data point arrives from the FIR filter, i.e., once every sample period of the FIR output 36, after nineteen interpolated data points in output stream 38 have been supplied by the CCI filter. Switch 84 between the delay 82 and the second input 86 of the summer 71 is also synchronized with switch 78 to disconnect the delayed output stream 80 and to connect the second input 86 of the summer 71 to ground 88 each time a new data point arrives from the FIR filter.

The CCI filter thus produces 19 linear interpolation points between every pair of successive data points (d[n] and d[n−T]) in the data stream 36 arriving at times (n and n−T) separated by the sample period (T) of the FIR filter output. Before the CCI filter interpolates the twentieth data point, which, in the absence of error, should correspond to the second data point (d[n]) scaled by the gain k of the filter, a third consecutive data point (d[n+T]) in data stream 36 arrives at the input of the CCI filter. This triggers the CCI filter to throw switch 78 to replace the filtered output 70 of the zero order hold with the previous true data point (d[n]) arriving from the output 36 of the FIR filter over the feedforward path 74, scaled by the gain k of the CCI filter. Delay 66 connected to the feedforward path provides the previous true data point (d[n]) from the data stream 36. At the same time, switch 80 connects input 86 of summer 71 to ground. The summer thus receives the scaled true data point (kd[n]) over input 79, which it adds to input 86 (which has been reset to zero) to produce the scaled true data point (kd[n]) at its output 38. Each switch 78, 84 then returns to its respective previous connection to allow the CCI filter to produce the next nineteen interpolated points between the second data point (d[n]) and the third data point (d[n+T]) arriving in the data stream 36 from the FIR filter.

The CCI filter therefore supplies only the nineteen sampled points interpolated between each data point in output 36 of the FIR filter. An incorrect twentieth sample resulting from an error in one of these nineteen samples is replaced by its original, correct value by the feedforward path and switches 78, 84. The integrator 62 subsequently uses the correct value of the sample in providing the next nineteen interpolated data points. The feedforward path thus prevents an error from persisting longer than a sample period of the FIR filter output, freeing the CCI filter from catastrophic errors that may severely mar its performance. In addition, the feedforward path accomplishes this without introducing any new source of catastrophic error into the CCI filter.

Figure 3:
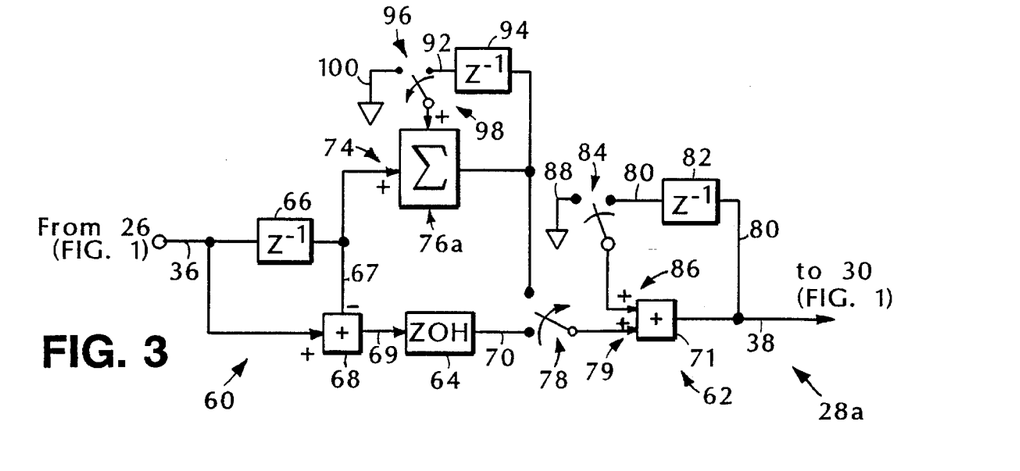
FIG. 3 is a block diagram of another second order interpolating filter.

In another CCI filter 28a, shown in FIG. 3, the multiplier 76 is replaced by a high speed adder 76a supplying the gain k in the feedforward path 74. The high speed adder adds the delayed FIR filter output 67 to a delayed output 92 of the adder from a first order delay 94 twenty times within a sample period of the FIR output 36. A switch 96 disconnects the delayed output 92 from an input 98 of the adder and connects the input 98 to ground 100 to reset the adder to zero before receiving the next delayed data point 67. Switch 96 is thus synchronized with switches 78, 84 to connect to ground once every sample period of the FIR filter output 36.

Figure 4:
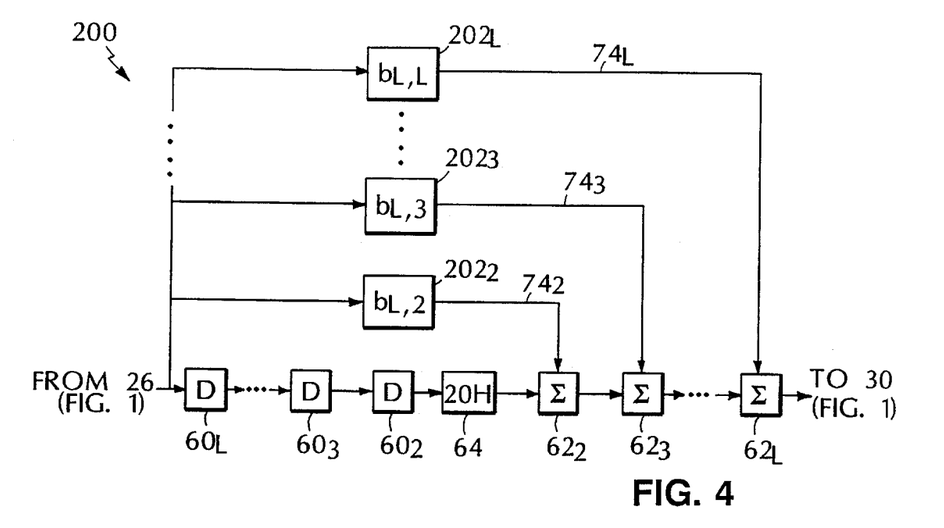
FIG. 4 is a block diagram of a generalized Lth order interpolating filter.

Higher order CCI filters include a series of differentiators connected across a zero order hold to a series of integrators. Referring to FIG. 4, an Lth order CCI filter 200 has L-1 differentiators $60_2$ to $60_L$ connected in series with L-1 integrators $62_2$ to $62_L$ across a zero order hold 64. A separate feedforward path $74_2$ to $74_L$ provides an error-free input to each integrator $62_2$ to $62_L$, respectively, in a manner analogous to that described above in connection with FIG. 2. (Switches selectively connecting the feedforward paths to the integrators are not shown separately in FIG. 4). Each feedforward path $74_2$ to $74_L$ contains a filter $202_2$ to $202_L$ duplicating the impulse response $b_{L,m}$ of the CCI filter 200 at the output of the corresponding integrator $62_m$.

The Lth order CCI filter 200 reduces to second order filters 28, 28a shown in FIGS. 1 and 2 when L=2. In filter 28, filter $202_2$ is formed by the gain element 76 and the delay 66 (the differentiator $60_2$ and filter $202_2$ share the delay 66 in this implementation). Similarly, in filter 28a (FIG. 3), filter $202_2$ is formed from adder 96 and the shared delay 66.

Figure 5:
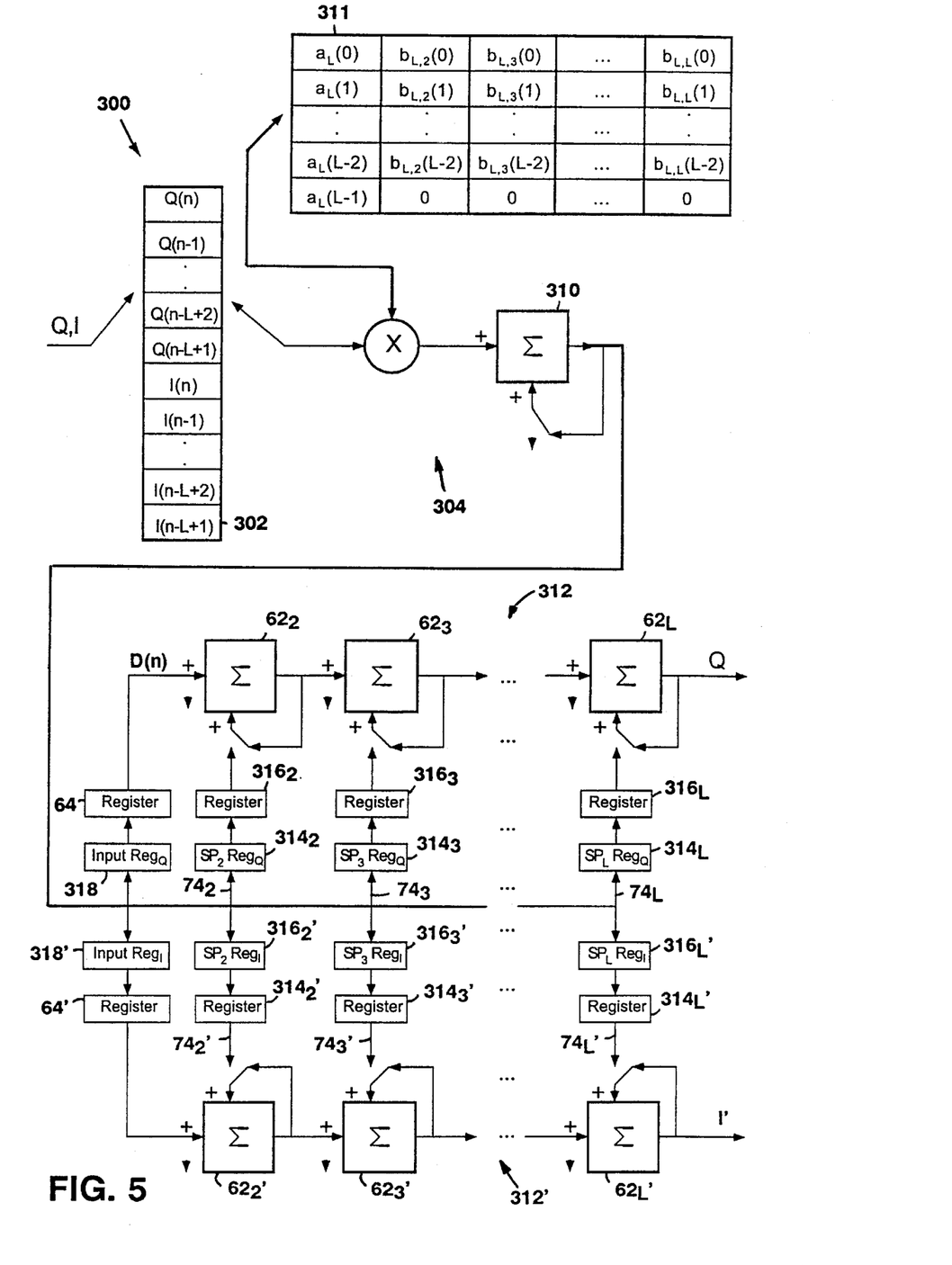
FIG. 5 is a block diagram for a generalized Lth order filter receiving two separate input signals.

Referring to FIG. 5, a modified Lth order CCI filter 300 receives interleaved quadrature signals Q(n) and in-phase signals I(n) at a shift register 302 of length 2(L-1). The filter 300 is used when the input to the filter has already been quadrature amplitude modulated.

In CCI filter 300, the L-1 differentiators $60_2$ to $60_L$ and the L-1 filters $202_2$ to $202_L$ (FIG. 4) are combined into a single FIR polyphase filter 304. The filter has a multiplier 308 in series with an adder 310 that together convolve the input Q(n), I(n) with each column of coefficients in array 311. The first column of coefficients $a_L(n)$ of array 311 corresponds to the impulse response of the L-1 cascaded differentiators $60_2$ to $60_L$ (FIG. 4). The mth column of coefficients $b_{L,m}(n)$ corresponds to the impulse response of the filter $202_m$ of the mth feedforward path $74_m$ (FIG. 4). The filter computations are clocked at the high clock rate of the output of the CCI filter, i.e., R (the interpolation factor) times the clock rate of the input I(n), Q(n).

The impulse response $a_L(n)$ of the first column of the polyphase filter is given by $$a_L(n) = \frac{(-1)^n}{n!} \prod_{k=0}^{n-1} (L-n+k) \qquad (1)$$

where n=0,1, ... L-1, and L (the order of the filter) is greater than or equal to one. The impulse response $b_{L,m}$ of each subsequent column m is:

$$b_{L,m}(n) = \qquad (2)$$

$$m \sum_{k=0}^{m-1} \frac{u(n-k)}{(n-k)!} \prod_{s=1}^{n-k} (L-m-n+k+s) \sum_{g=0}^{k} \frac{(-1)^{n-k+g}}{g!(m-g)!} \cdot$$

$$\prod_{j=0}^{m-2} (R(k-g+1)+j)$$

R is the interpolation factor of filter 300, m=2,3, ... , L, n=0,1, ... , L-2, and L (the order of the filter) is greater than or equal to two. The polyphase filter is optimized to have the fewest number of $b_{L,m}$ coefficients to increase computation speed. As a result, the last coefficient $b_{L,m}(L-1)$ of each column is zero. The polyphase filter coefficients are calculated once during initialization and stored in the array for subsequent use.

The polyphase filter is connected to two identical circuits 312, 312' by a pair of registers 318, 64 and 318', 64', respectively Registers 318, 318' separate the interleaved quadrature and in-phase outputs of the polyphase filter so that circuit 312 processes the quadrature input Q(n) and circuit 312' processes the in-phase input I(n). Registers 64, 64' act as zero order holds that increase the data rate of the outputs of registers 318, 318' by the interpolation factor R.

In circuit 312, each feedforward path $74_m$ is connected to an integrator $62_m$ by a set point register $314_m$ and a second register $316_m$. Set point registers $314_m$ (and corresponding registers $314'_m$ in circuit 312') de-interleave the quadrature and in-phase outputs of the polyphase filter in a manner similar to registers 318, 318' described above. Each register $316_m$ is clocked at the input clock rate. The output of the last cascaded integrator $62_L$ provides the interpolated quadrature output Q'(n) of the filter. The in-phase output of the polyphase filter is connected to each integrator $62'_m$ in circuit 312' in the same manner In operation, quadrature input data point Q(n) arrives at shift register 302 at the input clock rate. Each time a new data point is received, polyphase filter 304 convolves the quadrature input with the impulse response $a_L(n)$ stored in its first column of coefficients, as follows. Multiplier 308 multiplies Q(n) by $a_L(0)$ and stores the result H. At the next high rate clock pulse (i.e., the clock rate of the output of the CCI filter), multiplier 308 multiplies the previous quadrature point Q(n-1) by $a_L(1)$ and adder 310 adds this to the stored value H. The filter continues multiplying the quadrature data points in the shift register by the values $a_L$ and adding the results. At the end of L high rate clock pulses, the polyphase filter produces a data point D(n) corresponding to the (L-1)th order differentiation of the input evaluated at index n.

During subsequent high rate clock pulses, input register 318 receives and stores D(n). After the CCI filter 300 has finished interpolating the R data points between Q(n-2) and Q(n-1), integrator $62_2$ is ready to receive the new value D(n) to interpolate the next set of R data points between Q(n-1) and Q(n). At this time, D(n) is retrieved by register 64 and sent to the input of integrator $62_2$. Register 64 repeats the transfer of D(n) to integrator $62_2$ at each subsequent high rate clock pulse. Register 64 thus repeats the value of D(n) R times between each input clock pulse and acts as a zero order hold.

Before the next input clock pulse, polyphase filter 304 receives an in-phase data point I(n). Polyphase filter 304 convolves the in-phase input with its first column of coefficients $a_L(n)$ in the manner described above, and stores the result in input register 318'. Register 64' retrieves the value stored in input register 318' at the beginning of each cycle and sends this value to integrator $62'_2$, in the same manner described above.

The output of integrators $62_2$ and $62'_2$ subsequently pass through the cascaded integrators in each circuit 312, 312', to produce the interpolated output Q'(n) and I'(n), respectively. After the integrators have produced the R interpolated data points between Q(n) and Q(n-1), feedforward paths $74_m$, $74'_m$ replace the output of each integrator $62_m$, $62'_m$ with an appropriate error free value. This ensures that at every multiple of R, the values Q'(nR), I'(nR) produced by the filter correspond to their true interpolated values.

Polyphase filter 304 begins the error correction by convolving the quadrature input Q(n) with the second column of coefficients $b_{L,2}(n)$. This process is analogous to the differentiation described above, e.g., Q(n) is multiplied by $b_{L,2}(0)$ and stored. In the next high rate clock pulse, Q(n-1) is multiplied by $b_{L,2}(1)$ and added to the stored value. The process continues for L high rate clock pulses until the true value $Q_2(n)$ is found.

Set point register $314_2$ receives the value of $Q_2(n)$ and stores it until the CCI filter 300 has completed interpolating the R data points between Q(n-1) and Q(n). At this time, register $316_2$ retrieves $Q_2(n)$ from register $314_2$ and replaces the stored value in integrator $62_2$ with $Q_2(n)$. Thus any error that occurred in the integrator during the interpolation between Q(n-1) and Q(n) is corrected by ensuring that the nth value in integrator $62_2$ is the correct value $Q_2(n)$.

The polyphase filter processes the in-phase input in the same manner, and supplies a corrected output $I_2(n)$ to integrator $62'_2$ at the same time $Q_2(n)$ is supplied to integrator $62_2$.

The polyphase filter then produces the correct value $Q_3(n)$ for integrator $62_3$ by convolving the quadrature input with the third column of coefficients $b_{L,3}(n)$ in array 306. The polyphase filter next produces the corrected value $I_3(n)$ in the same manner. Registers $314_3$, $314'_3$ store the corrected values $Q_3(n)$ and $I_3(n)$ until registers $3146_3$, $316'_3$ supply the corrected values to integrators $62_3$, $62'_3$, respectively, at the appropriate time. The operation repeats for each remaining integrator $62_m$, $62'_m$.

Figure 6A:
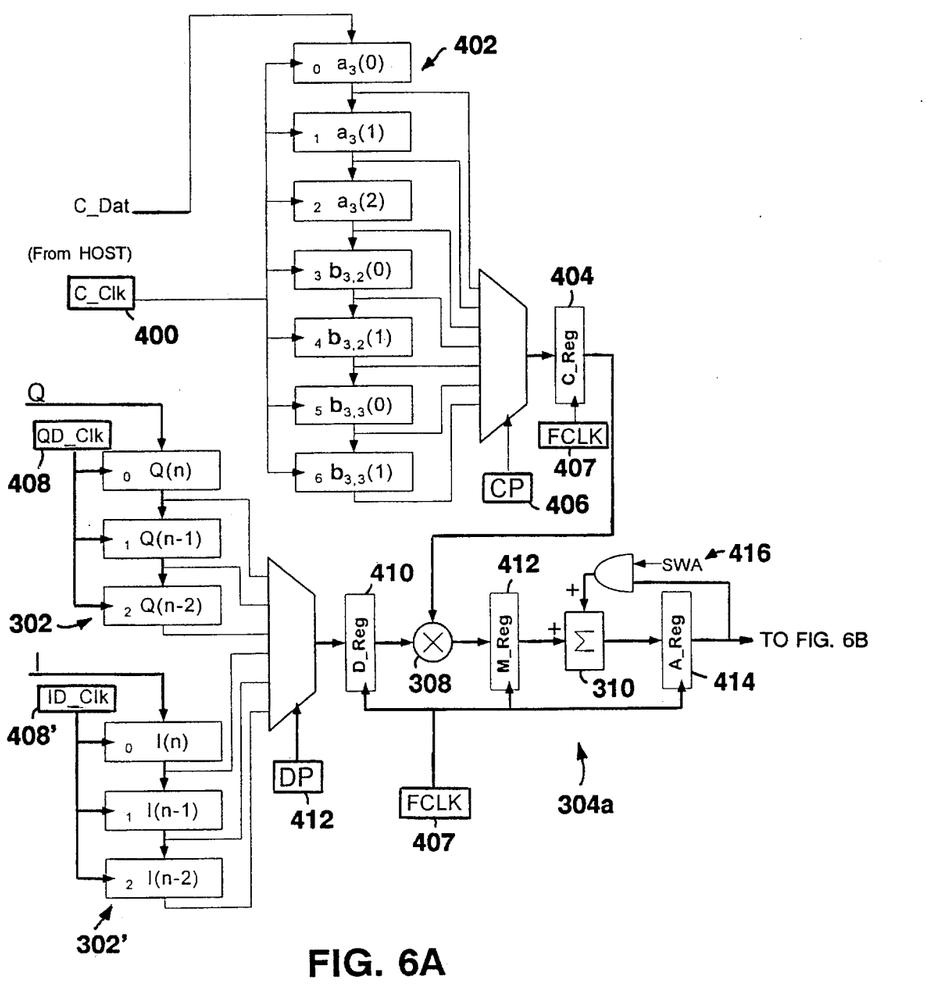
FIG. 6 is a block diagram of a third order interpolating filter.
Figure 6B:
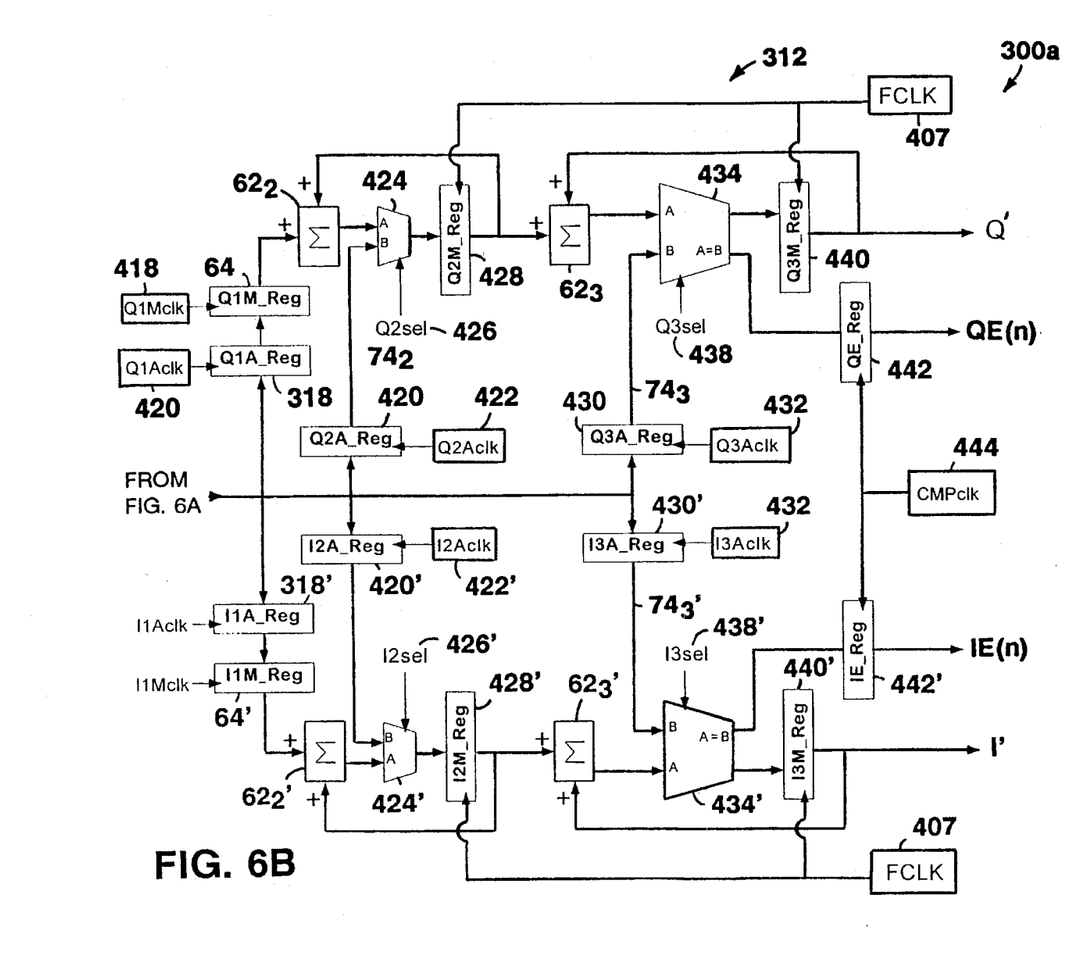

Referring to FIG. 6, a third order implementation 300a of the generalized CCI filter 300 of FIG. 5 has a polyphase filter 304a with seven coefficients. Polyphase filter 304a is connected to a clock 400 that controls loading of the coefficients into a shift register 402 during initialization. Register 404 ($C_{13}$reg) connected to the shift register retrieves the coefficient marked by pointer 406 at the high clock rate F_clk (supplied by clock 407).

Quadrature and in-phase data points enter separate shift registers 302, 302' at an input data rate controlled by clocks 408, 408', respectively. Register 410 (D_reg) retrieves the data point marked by data pointer 412 at the high clock rate (F_clk). The values contained in registers 404, 410 are multiplied by multiplier 308 and stored in register 412 (M_reg).

The value stored in register 412 is sent to adder 310, and the output of adder 310 is stored in register 414 (A-reg). The control signal SWA 416 clears the memory of the adder each time polyphase filter 304a begins to produce a new differentiated value D(n) or corrected value $Q_m(n)$, $I_m(n)$, as described in more detail below.

Register 64 (Q1M_reg) is the zero order hold for circuit 312. Each register 318, 64 is controlled by a separate clock 418, 420. Feedforward path $74_2$ contains a single register 420 (Q2A_Reg), controlled by its own clock 422. Multiplexer 424, controlled by signal 426, switches the output of integrator $62_2$ with the feedforward path $74_2$ once every R high rate clock pulses, as described above. Register 428 (Q2M_Reg) stores the output of integrator $62_2$ and is timed by the high rate clock 407 (F_clk).

The second integrator $62_3$ receives its input from register 428. The second feedforward path $74_3$ is connected to a single register 430 (Q3A_Reg) controlled by its own clock 432. The output of the second integrator and register 430 is fed to a combined multiplexer/comparator 434, that is controlled by signal 438. The multiplexer/comparator switches the output of integrator $62_3$ to that of register 430 once every R high rate clock pulses. This output is stored in register 440 (Q3M_Reg), clocked by the high rate clock 407. The output of register 440 is the interpolated quadrature output Q'(n) of the third order CCI filter 300a.

Multiplexer/comparator 434 also compares the output of the integrator $62_3$ and the feedforward path $74_3$ once every R high rate clock pulses, and sends an error signal QE(n) to register 442 (QE_Reg) if the two output signals are not identical. Register 442 is controlled by its own clock 444. Recurring errors indicate that one of the integrators $62_2$, $62_3$ is malfunctioning, and that circuit 312 should be replaced.

Circuit 312' is identical to circuit 312, and is used to process the in-phase input I(n). Elements in circuit 312' corresponding to those in circuit 312 are indicated by the same reference numerals, but are primed. Registers and signals in the in-phase circuit 312' have the same names as those of the quadrature circuit 312, except that the letter Q in those names has been changed to the letter I.

Figure 7:
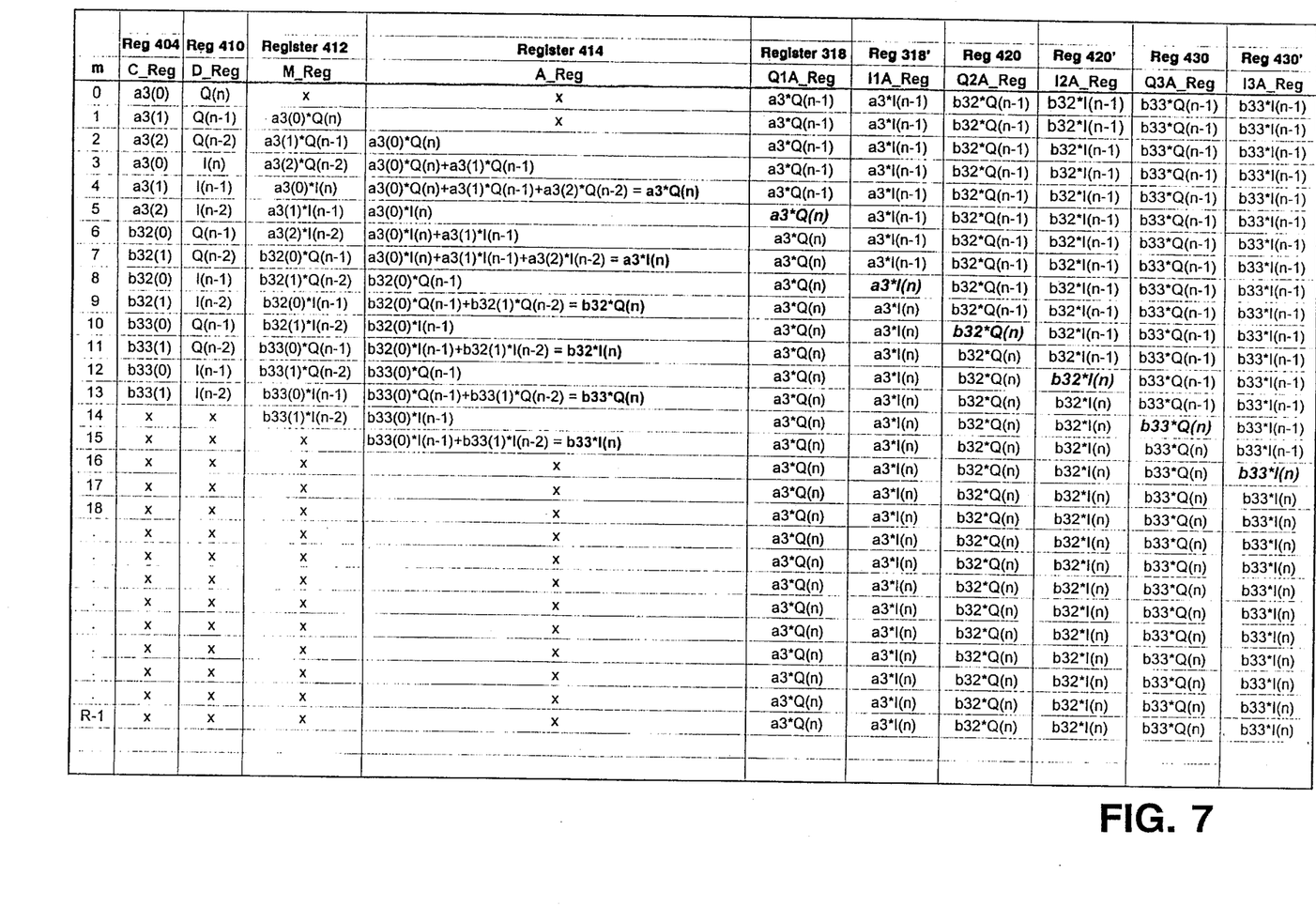

Each column in FIGS. 7 through 9 is labeled by the name and reference numeral of a particular register in the third order CCI filter 300a of FIG. 6. Each row indicates the contents of the registers at a given high rate clock pulse m. More precisely, the value of a register in a row where m=c indicates the output value of that register after the rising edge of clock pulse c but before the rising edge of clock pulse c+1. Only one cycle of R high rate clock pulses is shown; the contents of the registers are repeated in the next cycle of R high clock pulses with the input sample point n incremented by one (e.g., when m=R, n=n+1). The various clocks controlling the registers, the data and coefficient pointers for the shift registers, and the control signals for the transmultiplexers are arranged to cause the registers to contain the values indicated in FIGS. 7 through 9 at each high rate clock pulse m in the cycle. The details of how this timing is accomplished is determined by the set up and hold time of each individual register. In FIGS. 7 through 9, the function F(x) equals 0.5×(x+1).

The third order CCI filter 300a in FIG. 6 may be further refined to control the number of bits required to code each interpolated quadrature and in-phase data point Q'(n), I'(n). The number of bits needed is determined by the number of bits encoding the input points I(n), Q(n), the coefficients $a_L(n)$, $b_{L,m}(n)$, and the number of growth bits created by the gain of the integrators in the CCI filter. The number of growth bits (g) is given by:

$$g=(L-1)log_2 R \qquad (3)$$

where L is the order of the filter and R is the interpolation factor. Thus, to maintain a given number of bits at the output of the CCI filter, the coefficients $a_L(n)$, $b_{L,m}(n)$ need to be scaled to compensate for the number of growth bits g in the filter.

Figure 10:
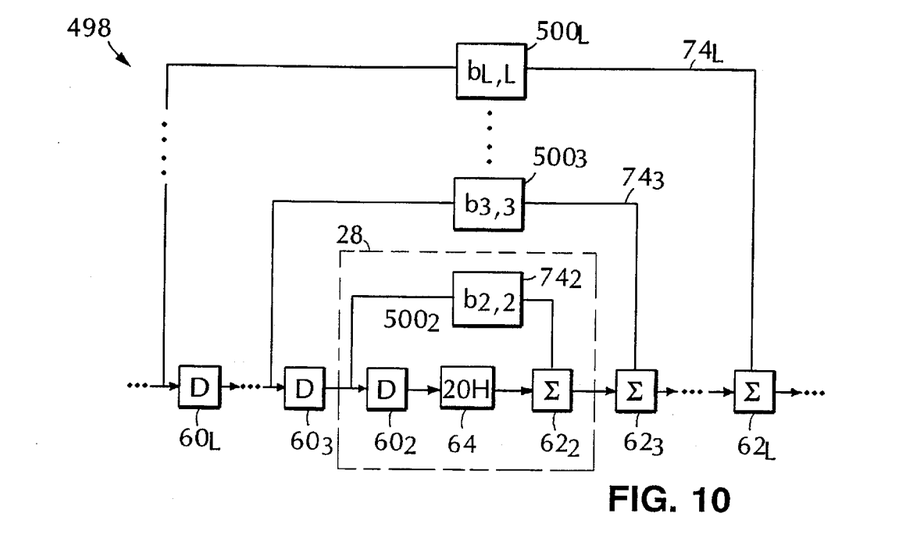
FIG. 10 is a block diagram of another generalized Lth order interpolating filter.

Other embodiments are within the following claims. For example, referring to FIG. 10, an Lth order filter 498 has an inner second order CCI filter 28. Filter 28 has feedforward path $74_2$ with a filter $500_2$ with impulse response $b_{2,2}$, given in Equation (2) above. Filter 28 is nested inside a differentiator integrator pair $60_3$, $62_3$. The outer integrator $62_3$ is connected to the input of differentiator $60_3$ by feedforward path $74_3$, containing a filter $500_3$ with impulse response $b_{3,3}$. Additional integrators and differentiators may be added to form an Lth order filter, with each filter $500_m$ in the feedforward path $74_m$ for integrator $62_m$ having an impulse response given by $b_{m,m}$. Many other permutations of the architecture of the Lth order CCI filter are possible.

In addition, the multiplexers in FIG. 6 may be moved before each integrator to switch the differentiated input of each integrator with the feedforward path, in a manner analogous to switches 78, 78a in FIGS. 2 and 3. Additional comparators may be added to each integrator in FIG. 6 to more precisely pinpoint a source of error in the filter 300. A comparator may also be added to any of the CCI filters in FIGS. 2 through 5.

In alternative embodiments, a single register may be used between each feedforward path $74_m$, $74'_m$ and integrator $62_m$, $62'_m$ in FIG. 6 The single register would be clocked to supply the corrected in-phase and quadrature inputs to their respective integrators at the appropriate time. In addition, the quadrature and in-phase inputs may be processed by two separate CCI filters 300a, each containing only one circuit 312, 312'.

The CCI filters described above may produce a larger number of interpolated points between every pair of successive input data points by providing a higher rate zero order hold 64 and modifying filters $b_{L,m}$ accordingly. For example, in the CCI filter of FIG. 2, the interpolating factor (R) is increased to 100 by providing a zero order hold increasing the data rate of its input by a factor of 100, and by providing a gain k=100 in the feedforward path.

In addition, any of the CCI filters described above may be modified to interpolate several interleaved signals, by adding a separate series of cascaded integrators (e.g, circuit 312 in FIG. 5) for each interleaved signal.

In other embodiments, the zero order hold in any of the CCI filters described above is replaced by an inner differentiator-integrator pair, connected in series by a upsampling switch increasing the data rate of the differentiator output by the interpolating factor. For example, for an interpolating factor of 20, the switch inserts nineteen zeroes between every pair of successive data points of the inner differentiator output before sending the output to the integrator.

The zero order hold in FIG. 2 is replaced by connecting the input of the inner differentiator in the differentiator-integrator pair to the output of the differentiator 60. The output of the inner integrator is similarly connected to the input 79 of the integrator 62. The inner differentiator and integrator are typically identical to the differentiator 60 and integrator 62, respectively. A second switched feedforward path is connected between the delayed input to the inner differentiator and the input of the integrator in a manner analogous to feedforward path 74 described above to prevent the inner integrator from introducing catastrophic errors into the filter output.

The CCI filters described above may also employ more complex integrators and differentiators in lieu of integrators 62 and differentiators 60, e.g., integrators and differentiators employing higher order delays, that shift a data stream by more than one sample period. When such differentiators and integrators are used, the zero order hold must be replaced by the inner differentiator-integrator pair described above. In these embodiments, the feedforward path is connected and operates in the manner described above, i.e. between a first order delayed input stream to the filter and the input to the integrator.

One possible application of this technology, among many, would be in transmitting a multichannel cellular signal from a single source.

What is claimed is:

1. A digital interpolator, comprising
   a filter processing digital data at a first data rate to produce filtered data and differentiated data,
   means connected to an output of the filter, said means increasing the data rate of the differentiated data,
   an integrator connected to said means, the integrator receiving the differentiated data at a second data rate higher than the first data rate, and
   a feedforward path between said filter and said integrator, said feedforward path providing said filtered data to said integrator, said filtered data representing an output of said integrator in the absence of error.

2. The interpolator of claim 1, wherein the filter comprises a differentiator producing the differentiated output and a component producing the filtered output.

3. The filter of claim 2 wherein the component comprises a multiplier.

4. The filter of claim 2 wherein the component comprises an adder.

5. The interpolator of claim 1 further comprising a switch connected between said feedforward path and said integrator, said switch selectively connecting said feedforward path to said integrator.

6. The interpolator of claim 5 wherein said switch connects said feedforward path to said integrator at the first data rate.

7. The interpolator of claim 1 further comprising a second integrator connected in series with the first integrator.

8. The interpolator of claim 7 further comprising a second feedforward path, said second feedforward path being connected between said filter and said second integrator.

9. The interpolator of claim 1 further comprising a comparator connected to said feedforward path and said integrator, said comparator comparing an output of said integrator and said filtered data.

10. The interpolator of claim 1 further comprising a second integrator connected in parallel to said first integrator, wherein said filter receives separate signals to produce separate differentiated and filtered signals, each said integrator processing separate differentiated and filtered signals.

11. The interpolator of claim 10 wherein said second integrator is connected to said means and a second feedforward path is connected between said filter and said second integrator, wherein said filter processes two signals each arriving at the first data rate to produce two differentiated signals and two filtered signals, said first integrator receiving a first differentiated signal and a first filtered signal and said second integrator receiving a second filtered signal and a second differentiated signal.

12. The interpolator of claim 10 wherein the two signals are interleaved.

13. The interpolator of claim 1 wherein said means comprises a zero order hold connected to receive samples from the filter, the zero order hold sending the samples to the integrator at the second data rate.

14. The interpolator of claim 1 wherein said means comprises an upsampling switch.

15. The interpolator of claim 1 further comprising (L-2) integrators connected in series to the first integrator, where L is an integer greater than two, and wherein a portion of said filter producing said differentiated output has an impulse response $a_L(n)$ given by $$a_L(n) = \frac{(-1)^n}{n!} \prod_{k=0}^{n-1} (L - n + k)$$

where n=0,1, ... L-1.

16. The interpolator of claim 1 further comprising (L-2) integrators connected in series to the first integrator, where L is an integer greater than two, and a separate feedforward path connected between each of said (L-2) integrators and said filter, wherein said filter produces a filtered output for each integrator, a portion of said filter producing said filtered output sent to an mth integrator via an mth feedforward path having an impulse response $b_{L,m}(n)$ given by:

$$b_{L,m}(n) = \tag{2}$$

$$m \sum_{k=0}^{m-1} \frac{u(n-k)}{(n-k)!} \prod_{s=1}^{n-k} (L - m - n + k + s) \sum_{g=0}^{k} \frac{(-1)^{n-k+g}}{g!(m-g)!} \cdot$$

$$\prod_{j=0}^{m-2} (R(k - g + 1) + j)$$

where u(n)=1 n≧0
     =0 n<0
where R is the interpolation factor of the interpolator, m=2,3, ..., L, and n=0,1, ..., L-2.

17. The interpolator of claim 2 further comprising a second integrator connected in series with said first integrator, and a second filter producing differentiated output and filtered output, said second filter comprising a second differentiator receiving input data, the differentiated output of said second differentiator being connected to an input of said first differentiator, a component producing said filtered output from said input data, said filtered output representing an output of said second integrator in the absence of error, and a second feedforward path connected between said component and said second integrator.

18. A transmultiplexer for combining narrowband signals into a wideband signal, comprising two interpolators, each interpolator processing one of said narrowband signals, each interpolator comprising a filter processing a narrowband signal at a first data rate to produce filtered data and differentiated data, means connected to an output of the filter for increasing the data rate of the differentiated data, an integrator connected to said means, the integrator receiving the differentiated data at a second data rate higher than the first data rate, and a feedforward path between said filter and the integrator, said feedforward path providing said filtered data to said integrator, said filtered data representing data produced by said integrator in the absence of error, and an adder combining an output of each interpolator to produce the wideband signal.

19. The transmultiplexer of claim 17 further comprising a second interpolating filter connected in series with each interpolator.

20. A method for interpolating digital data, comprising processing the digital data at a first data rate to produce filtered data and differentiated data, increasing the data rate of the differentiated data, integrating the differentiated data to produce processed data, selectively replacing a value of the processed data with a value of the filtered data that represents the processed data in the absence of error.

21. The method of claim 20 wherein a value of the processed data is replaced with a value of the filtered data at the first data rate.

22. The method of claim 20 further comprising integrating the processed data.

23. The method of claim 22 further comprising selectively replacing a value of the processed data after it has been integrated with a value of the filtered data that represents the processed data after it has been integrated in the absence of error.

24. The method of claim 20 further comprising comparing the value of the processed data to the value of the filtered data.

25. The method of claim 20 further comprising processing a second stream of digital data to produce a second stream of filtered and differentiated data, increasing the rate of the second stream of differentiated data, integrating the second stream of differentiated data to produce a second stream of processed data, selectively replacing a value of the second stream of processed data with a value of the second stream of filtered data representing the processed data in the absence of error.

26. The method of claim 25 wherein the digital data and the second stream of digital data are interleaved.

27. The method of claim 20 further comprising integrating the processed data (L-2) times, where L is an integer greater than two, and wherein processing the digital data to produce the differentiated data comprises convolving the data with an impulse response $a_L(n)$ given by $$a_L(n) = \frac{(-1)^n}{n!} \prod_{k=0}^{n-1} (L-n+k)$$

where $n=0,1, \ldots L-1$.

28. The method of claim 20 further comprising integrating the processed data (L-2) times, where L is an integer greater than two, and wherein processing the digital data to produce the filtered data comprises convolving the data with an impulse response $b_{L,m}(n)$ given by:

$$b_{L,m}(n) = m \sum_{k=0}^{m-1} \frac{u(n-k)}{(n-k)!} \prod_{s=1}^{n-k} (L-m-n+k+s) \sum_{g=0}^{k} \frac{(-1)^{n-k+g}}{g!(m-g)!} \prod_{j=0}^{m-2} (R(k-g+1)+j) \quad (2)$$

where $u(n)=1$ $n>0$
$=0$ $n<0$ where R is the interpolation factor of the interpolator, $m=2,3, \ldots, L$, and $n=0,1, \ldots, L-2$.

29. A method for combining narrowband signals into a wideband signal, comprising processing each said narrowband signal to produce an interpolated signal, and combining the interpolated signals to produce the wideband signal, said interpolating comprising processing the narrowband signal at a first data rate to produce filtered data and differentiated data, increasing the data rate of the differentiated data, integrating the differentiated data to produce processed data, selectively replacing a value of the processed data with a value of the filtered data representing the processed data in the absence of error.

30. The method of claim 29 further comprising interpolating each narrowband signal before processing.

* * * * *